R. BAGGALEY.
MEANS FOR UTILIZING THE HEAT OF MOLTEN SLAG.
APPLICATION FILED FEB. 25, 1915.

1,160,817.

Patented Nov. 16, 1915.
10 SHEETS—SHEET 3.

R. BAGGALEY.
MEANS FOR UTILIZING THE HEAT OF MOLTEN SLAG.
APPLICATION FILED FEB. 25, 1915.

1,160,817.

Patented Nov. 16, 1915.
10 SHEETS—SHEET 4.

WITNESSES

INVENTOR

R. BAGGALEY.
MEANS FOR UTILIZING THE HEAT OF MOLTEN SLAG.
APPLICATION FILED FEB. 25, 1915.

1,160,817.

Patented Nov. 16, 1915.
10 SHEETS—SHEET 6.

R. BAGGALEY.
MEANS FOR UTILIZING THE HEAT OF MOLTEN SLAG.
APPLICATION FILED FEB. 25, 1915.

1,160,817.

Patented Nov. 16, 1915.
10 SHEETS—SHEET 7.

R. BAGGALEY.
MEANS FOR UTILIZING THE HEAT OF MOLTEN SLAG.
APPLICATION FILED FEB. 25, 1915.

1,160,817.

Patented Nov. 16, 1915.
10 SHEETS—SHEET 8.

R. BAGGALEY.
MEANS FOR UTILIZING THE HEAT OF MOLTEN SLAG.
APPLICATION FILED FEB. 25, 1915.

1,160,817.

Patented Nov. 16, 1915.
10 SHEETS—SHEET 10.

UNITED STATES PATENT OFFICE.

RALPH BAGGALEY, OF PITTSBURGH, PENNSYLVANIA.

MEANS FOR UTILIZING THE HEAT OF MOLTEN SLAG.

1,160,817.         Specification of Letters Patent.         Patented Nov. 16, 1915.

Application filed February 25, 1915. Serial No. 10,474.

*To all whom it may concern:*

Be it known that I, RALPH BAGGALEY, a citizen of the United States, residing at Pittsburgh, Allegheny county, Pennsylvania, have invented a new and useful Improvement in Means for Utilizing the Heat of Molten Slag, of which the following is a full, clear, and exact description, reference being had to the accompanying drawings, forming part of this specification, in which—

Fig. 9ª is a side view showing two adjacent generators, one in upright and the other in inverted position.

My invention has relation to means for utilizing the heat of molten slag.

It has been apparent for many years to those conversant with the smelting business in its various forms that an enormous waste of heat units occurs whenever molten slag is uselessly cast on a dump pile. In the smelting of copper, gold, and silver ores, for instance, this slag amounts to from eighty-five to ninety-eight per cent. of the weight of the ore, to which must be added the weight of lime or other flux. This latter, in the smelting of silicious copper ores, often amounts to forty per cent. of the weight of the furnace charge. If the heat units in the slag produced could be properly conserved, the entire present cost of fuel or other power in many smelters could be saved; and in any smelter a great reduction in power cost would be possible. A relatively small smelter spends approximately five thousand dollars per month for power alone, and for larger smelters the cost is proportionately increased. Furthermore, in metallurgical practice, such as reverberatory furnace work, and particularly where powdered coal is used, the efficiency could be increased very materially by an economical preheating of the air. For this purpose there is also a large field for the utilization of molten slag.

A large number of attempts have heretofore been made to utilize molten slag in the generation of power; but these have been successful to only a very slight extent. In so far as I am aware, prior to my invention, no commercially operative apparatus has been developed which is capable of producing more than two or three pounds of steam per square inch, and even this is obtained in a wasteful and unsatisfactory manner. With these low pressures, turbos or vacuums are depended upon to produce power.

In developing a commercial power generator, it is important that high steam pressures should be obtained; and theoretically there is no good reason why as high pressures may not be obtained with molten slag as from the combustion of carbonaceous fuel. The temperature of molten iron blast furnace slag may vary between 1800 degrees and 2600 degrees Fahrenheit. In copper furnaces the temperature of the slag varies from 1800 to 2100 degrees Fahrenheit. In copper converters the temperature of the slag varies from 1800 to 2500 degrees Fahrenheit. In lead furnaces the temperature of the slag is about 1800 degrees Fahrenheit. To produce a steam pressure of 125 pounds it is only necessary to heat water to about 344 degrees Fahrenheit. The problem consists in the provision of means whereby the heat of the slag may be transmitted to the water. I have devoted many years investigation to this problem; and have ascertained that the following features are either essential to or at least extremely desirable in the development of a successful apparatus for the utilization of molten slag:

1. The slag must not be able to shrink away from actual contact with its container at any time.
2. The slag must be delivered in such small units that it will congeal promptly.
3. A great number of such small units must be provided in order to obtain sufficient heating surface.
4. The volume of water to be heated must bear a proper proportion to the volume of slag which does the heating.
5. As the slag units congeal, cool, and shrink, they should be free to fall by gravity so as to remain in actual contact with the container on all sides.
6. The slag supply ladle should contain the same quantity of slag as the power generator units, so that the slag may be poured quickly, without measuring.
7. The whole vessel should be well protected on all sides to prevent heat radiation.
8. As the slag tonnage is very large, the spent slag should be handled by machinery.
9. The feed-water should be preheated to approximately 210 degrees Fahrenheit, in order to secure proper efficiency in the apparatus.
10. The apparatus must be absolutely safe at all times against explosions or other accidents.
11. The free and complete discharge of the spent slag by mechanical means is important.
12. The possibility of water leaks into the molten slag must be absolutely guarded against to prevent disastrous explosions.
13. The apparatus must be durable in ordinary use.
14. The apparatus should not be more expensive to build than good boilers of the same capacity.
15. When the spent slag is used, after being discharged from the generator units, for the purpose of preheating the feed-water, care should be exercised to prevent excessive sulfur in the feed-water. This can be neutralized by any of the well known chemical methods, or the hot spent slag may be delivered into a submerged container in the feed-water tank in a manner to prevent the slag from coming into actual contact with the feed-water.
16. In order to provide sufficient heating surface, as well as to simplify the discharge of the spent slag, it is essential that the small slag units be located in one or more holding vessels which are separate and distinct from the boiler.
17. In order to maintain a supply of dry steam, a dome or storage boiler should be provided which is distinct from the water storage boiler.

My present invention is designed to provide apparatus in which the foregoing features are embodied in a practical way, to the production of an economical and efficient power generator.

A further object of my invention is the provision of apparatus of this character which may be used to practical advantage in the production of a hot blast, the molten slag in this case being used for the direct heating of air in any desired volume.

Figs. 1 to 7, inclusive, of the accompanying drawings, illustrate my preferred form of power generator. This form of the invention is preferred, because it is cheaper to build, and is more elastic. Any number of generators, from one up, can be placed side by side to utilize any tonnage of slag which may be produced in any particular case. It can be enlarged from time to time without disturbing or even remodeling the existing plant.

Figure 1:
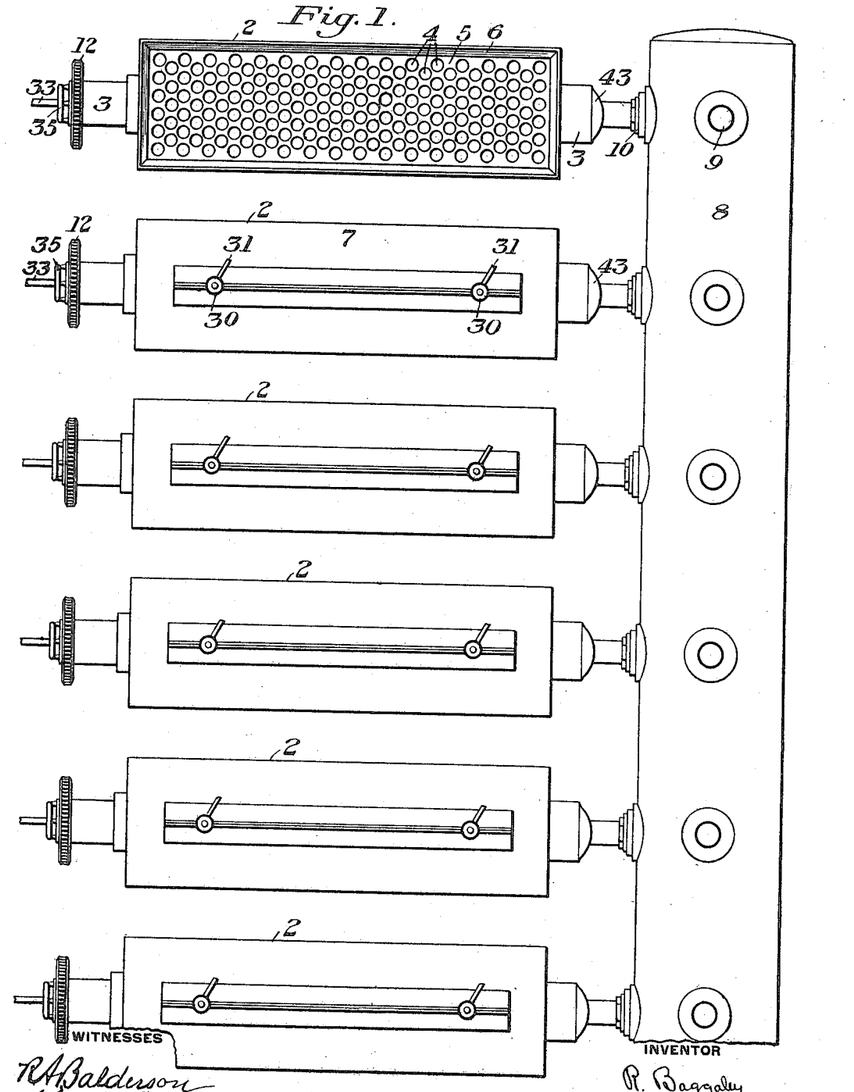
Figure 1 is a plan view, partly diagrammatic, illustrating a preferred form of steam power generator embodying my invention.

The plant as shown in Fig. 1 consists of six generators 2. The first generator is shown as having its cover removed. Each of these generators consists of an outer container, which in this case is shown as being of oblong form and rotatably mounted on the end trunnions 3, which in turn are supported on antifriction rollers $3^a$, as best shown in Fig. 3. In the particular plant illustrated, each generator is designed to contain one hundred eighty-two small slag tubes or units 4. These slag tubes are rigidly secured at their upper ends in a top plate 5 which is set a considerable distance below the top of the container, and upon which rests a hopper 6 having a seat for a removable cover plate 7. The tubes 4 are preferably of decreasing diameter toward their lower ends, being preferably about three inches in diameter at the top and two and one-half inches in diameter at the bottom. They are preferably arranged in staggered relation and extend downwardly to a point near the bottom of the container. Preferably, the total cross sectional area of these tubes in any container will be approximately one-half the total cross sectional interior area of the container. One trunnion of each container is made hollow, and this hollow trunnion connects the interior of the container with the interior of a water-supply boiler 8. This boiler may be common to any desired number of generators and may be of any desired character. It is provided with connections 9 leading to a separate steam dome or steam boiler above (not shown). Each of the hollow trunnions where it enters the steam boiler 8 is provided with a stuffing box 10 which forms a steam and water-tight connection in which the trunnion can rotate. 11 designates a division plate in the passage through the hollow trunnion, and which is for the purpose of maintaining a continuous even circulation between the container and the boiler, the steam and hot water escaping through the passage above this division plate, while the water supply enters the container through the passage below said plate. Without some provision of this character, the rapidly escaping steam would seriously obstruct the inflow of the water supply, particularly at times when the molten slag is being renewed. This would tend to burn out the tubes and the top plate unnecessarily. The trunnion at the end of each generator opposite the boiler 8 is provided with suitable gearing by means of which the container can be rotated. Any suitable mechanism may be provided for this purpose. In the drawing I have shown the trunnion as having a worm wheel 12 meshing with a worm 13 on a shaft 14. 15 is a friction wheel secured to said shaft and designed to be driven by contact with either one of two friction wheels 16 and 17 mounted on a slide bar 18 and adapted in turn to be driven by a friction wheel 19 on the power shaft 20. The bar 18 has a guiding support 21 at one end portion and its outer end is loosely connected at 22 with a vertical lever 23 pivoted at 24. This lever may be held in different positions by means of the spring bolt lock or latch 25 adapted to engage any one of several notches in a sector lock plate 26. In Fig. 3 the parts are shown in intermediate position, in which the friction wheel 15 is out of contact with both the friction wheels 16 and 17; and both of these are also out of contact with the friction wheel 19. By moving the lever 23 to the left, friction wheel 16 will be brought into driving engagement with wheels 15 and 19 to rotate the generator in one direction; and by moving said lever to the right, friction wheel 17 will be brought into driving engagement with driving wheels 15 and 19 to rotate the generator in the opposite direction. After the completion of a revolution, it is of great importance that the generator should stop at an exact point so as to insure a level surface of the top plate with an even flow of the molten slag, at the next filling of the slag tubes. I prefer to accomplish this by means of the latch bolt 27, capable of being operated by a hand lever 28 and arranged to engage a lug 29 on the bottom of the generator. I also preferably provide means for automatically raising and lowering the cover 7 of each generator. For this purpose I have illustrated (see Fig. 2) the compressed air cylinders 30 having the air-supply pipes 31 leading to the control valve 32. This control valve may be automatically operated by means of the lever 33 having at its inner end a roller 34 (see Figs. 6 and 7), engaging a cam 35 on the end of the adjacent generator trunnion 3. This cam may be so designed that it will be impossible to start the rotation of any generator without at the same time automatically raising its cover. In addition to this automatic movement, the lever 33 may be operated by hand to operate the valve 32 and hold it in any desired position, suitable locking means for the said lever being indicated at 36 in Fig. 3. In this manner the cover may be raised at any time, and, if desired, locked there without revolving the generator. 37 (Fig. 2) designates a feed-water heating tank which is placed below each generator and into which the contents of the slag tubes are intended to be discharged when the generator is inverted. 38 designates a conveyer working through the lower portion of this tank for the purpose of carrying off the spent slag. 39 is a spray pipe placed across the upper portion of the tank 37 below each generator, and through which water may be admitted under pressure for the purpose of spraying the slag tubes and top plate when the generator is inverted. This pipe is shown as having a control valve 40 attached to a lever system 41 (see Figs. 2 and 3) carrying a roller 42 adapted for engagement with the cam surface 43 on the hollow trunnion of the generator. When the generator is revolving to discharge the spent slag, and has moved to a position where the edge of the top plate comes above the water pipe 39, the cam surface 43 engages the roller 42 and thereby actuates the lever system 41 to open the valve 40 and admit water under pressure to the spray pipe. The top plate and slag tubes are then thoroughly sprayed until such time as the top plate has passed the water pipe, whereupon the spring 44 connected to the lever system 41 closes the valve 40 and stops the flow. The spraying water falls into the feed-water tank 37 and thus helps to maintain the supply of feed-water.

Figure 2:
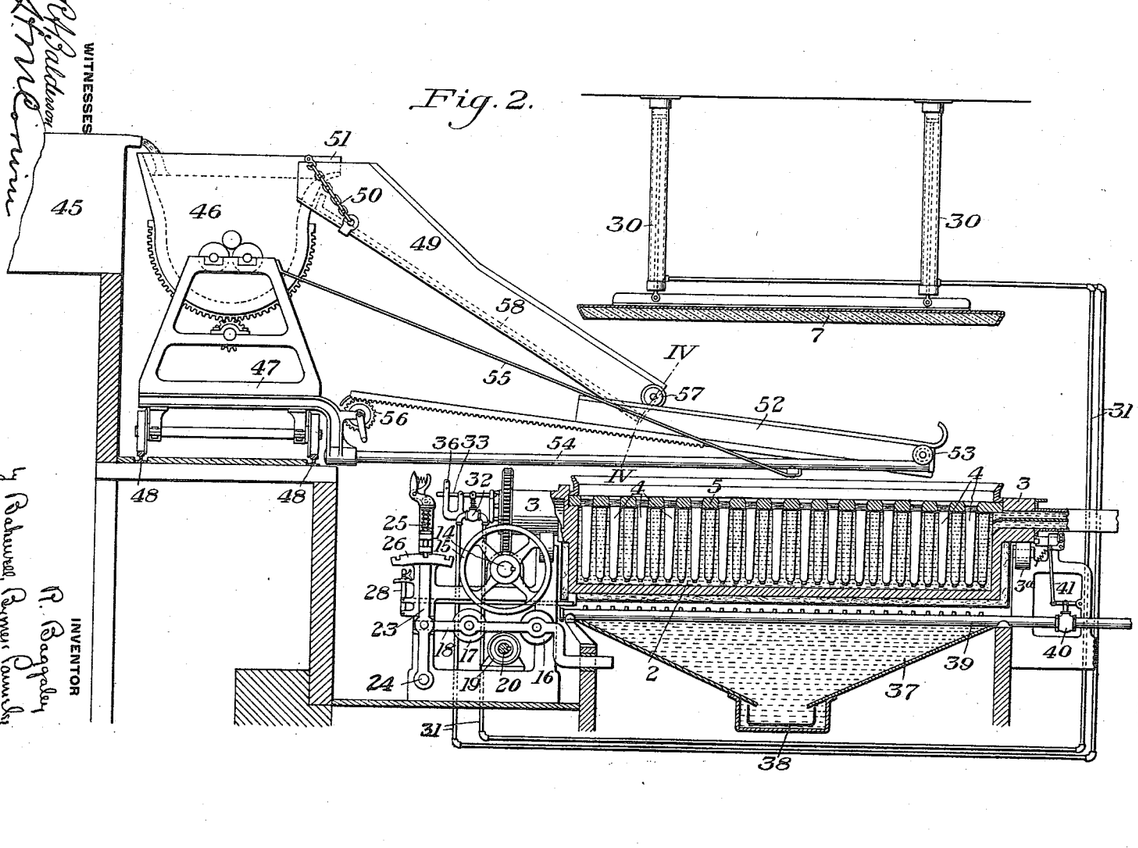
Fig. 2 is a vertical cross section through one of the generators, and also showing means for charging the same with slag.
Figure 3:
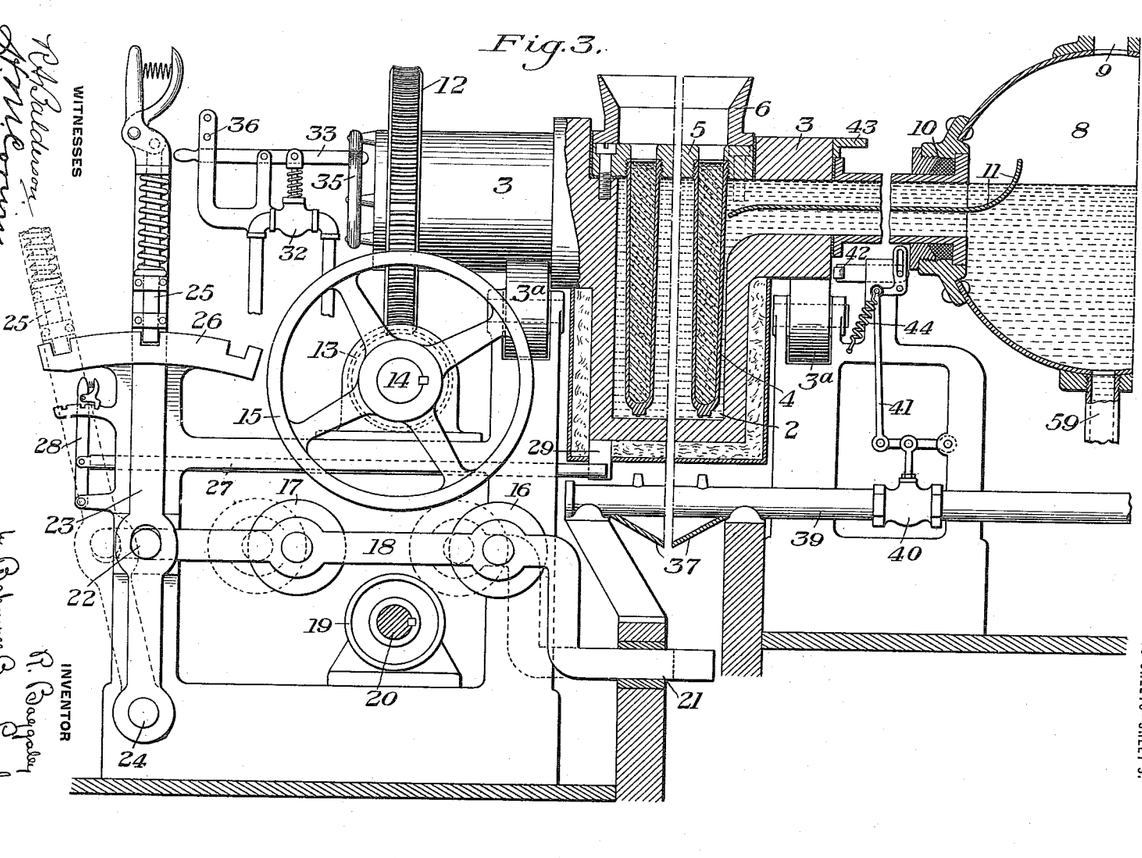
Fig. 3 is a vertical cross section on a larger scale, and partly broken away, showing one of the generators and the adjacent parts.
Figure 4:
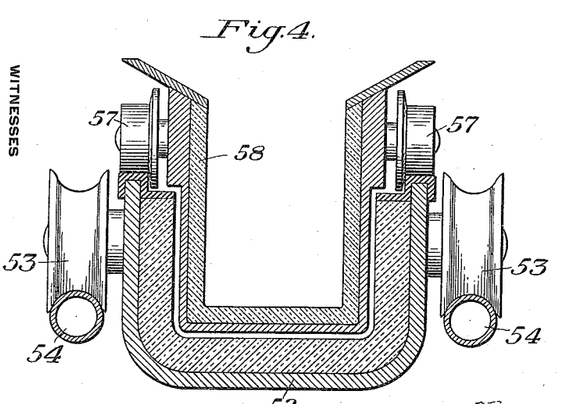
Fig. 4 is a cross section on the line IV—IV of Fig. 2.
Figure 5:
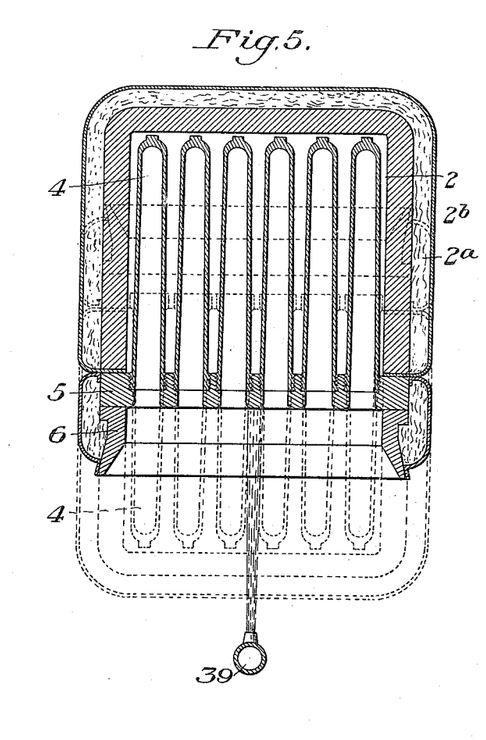
Fig. 5 is a cross section of one of the generators in inverted position.
Figure 6:
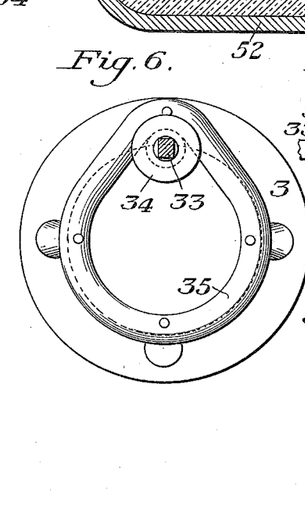
Figs. 6 and 7 are detail views showing the valve operating device.
Figure 7:
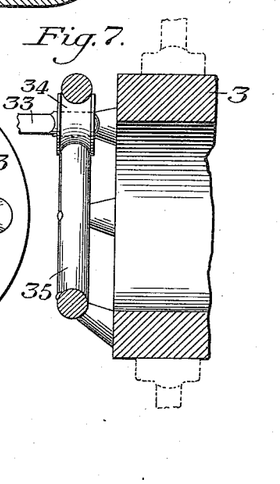

In Fig. 2 I have also illustrated a preferred form of apparatus for supplying the slag tubes with molten slag, which will now be described. 45 designates a furnace forehearth or other source of molten slag supply. 46 is a slag ladle tiltably mounted on a ladle car 47. This car is in turn mounted upon tracks 48 so that it may serve any desired number of the generators. This car may be moved by an electric motor or any other suitable power in a well known manner, and the ladle may be provided with the usual tipping motor or cylinder (not shown). 49 designates the upper section of a pouring spout, which is preferably suspended, as indicated at 50, from the pouring lip 51 of the ladle, so that the spout may adjust itself automatically at all times, as the ladle is tipped during pouring. 52 designates a lower section of the pouring spout within which the lower end portion of the upper spout section telescopes in the manner best shown in Fig. 4. This lower spout member 52 is arranged to travel backward and forward over the generator in order to deliver the molten slag evenly into all of the tubes or units. In the arrangement shown in Figs. 2 and 3 it is provided with rollers 53 which travel on the pipe tracks 54 carried by the frame of the car 47 and supported by suitable brace rods 55. It may be actuated by any suitable means such as the rack and gearing 56. The upper spout section may also be provided with rollers 57 at its lower end which travel on the upper edges of the lower trough section. Each of the spout sections may have the usual refractory lining 58.

In the particular apparatus illustrated in the drawings the ladle car is designed to hold about eight thousand pounds of molten slag. Each of the one hundred eighty-two slag tubes of each generator is of sufficient capacity to hold about forty-five pounds of slag. The slag is preferably delivered into these tubes at a temperature of from 2000 to 2200 degrees Fahrenheit; and is discharged from the tubes into the feed-water heating tank 37 at a temperature not less than 400 degrees Fahrenheit. The spent slag should be discharged from and fresh molten slag replenished in each generator about once per hour. In this way each generator is intended to deliver approximately forty horse-power at one hundred twenty-five pounds pressure. A much higher pressure may be produced, if desired, and the available horse-power doubled by the turbo-vacuum system. It is important that the molten slag be transferred quickly from the ladle into the small tubes, in order to avoid the loss of heat units. For this reason, the ladle should preferably hold the exact amount of slag to fill all of the tubes, and no more. No slag should be allowed to overflow onto the top plate, as this, in cooling, might form fins which would tend to hold the congealed slag suspended in one or more of the tubes. It is intended that the slag in each tube will settle by gravity as it congeals and cools and shrinks, so that the slag will always be in actual contact with the tapering sides of the tubes. By the action of the spray pipe 17, the top plate and each separate slag tube receives a bath of water at the time of each discharge operation; and this thoroughly cracks the congealed slag and causes it to drop into the feed-water tank and onto the conveyer 38 for removal.

I preferably provide each generator container 2 with a heat retaining jacket $2^a$, and this in turn may have a sheet metal covering $2^b$ (see Fig. 5) which will protect the jacket against moisture.

The water level in the boiler 8 is preferably maintained at or about the bottom level of the top plate, by any suitable means, in order to prevent burning of the tubes and of the top plate itself. When the generator is inverted, a portion of the tubes will not then be submerged in water. No injury to the tubes, however, can result from this, because the spent slag will then be at a temperature not exceeding 600 degrees Fahrenheit, and also because each tube will receive a copious bath of water from the spraying nozzles.

59 designates a mud valve or clean-out for the boiler 8.

Figure 8:
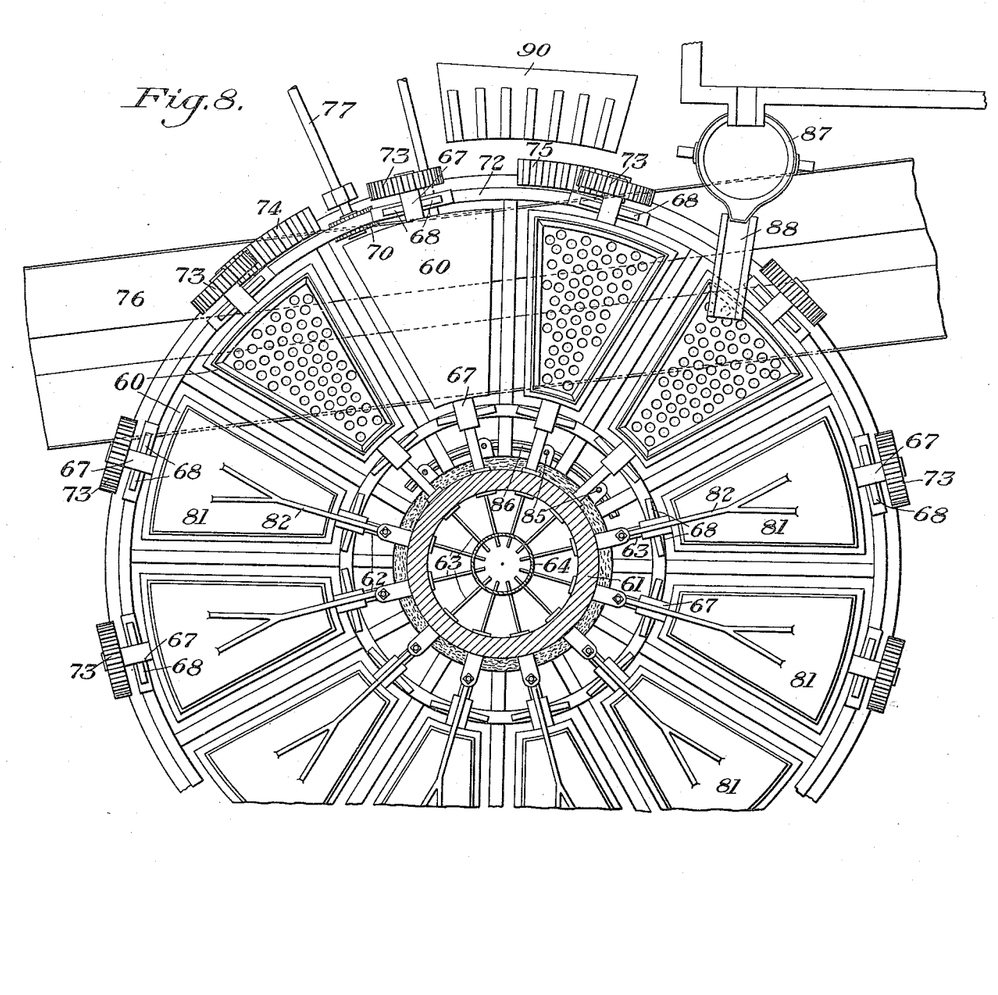
Fig. 8 is a plan view showing another form of generator embodying my invention.
Figures 9, 9A:
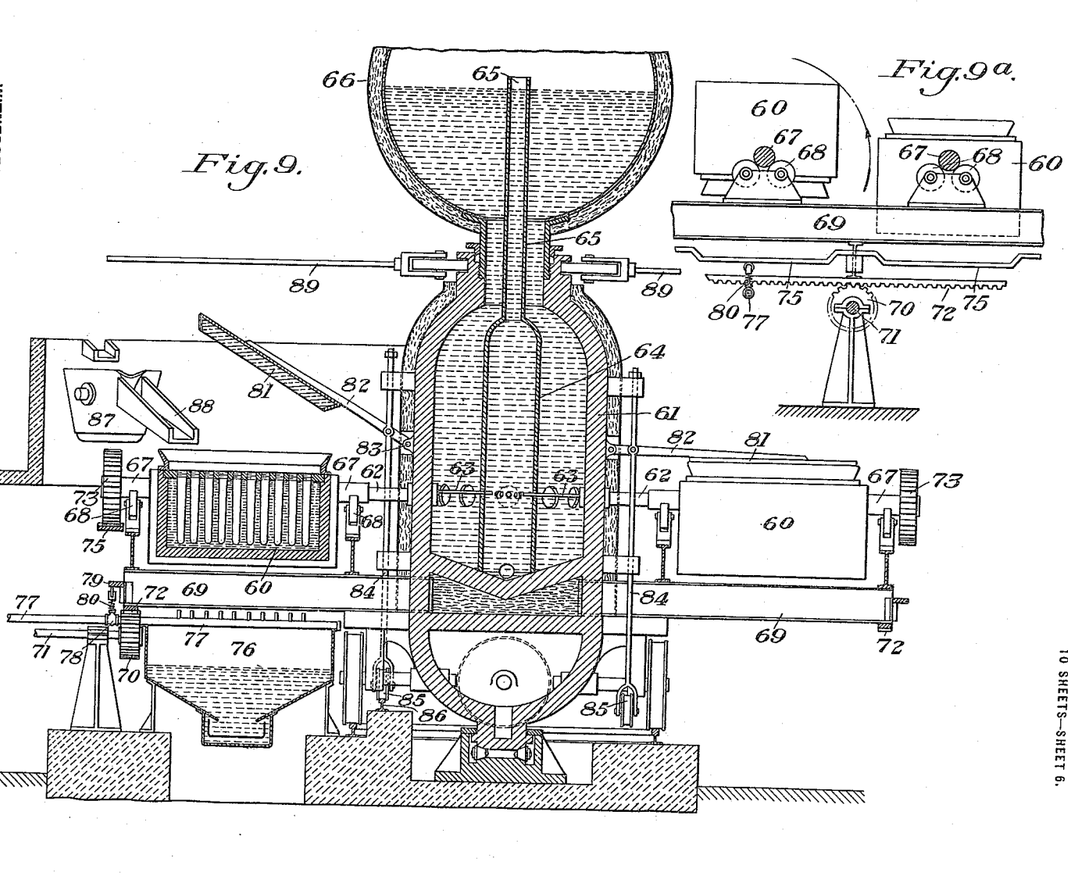
Fig. 9 is a transverse vertical section of the apparatus shown in Fig. 8.

In Figs. 8, 9 and $9^a$ I have shown a modified form of the apparatus in which the generators are mounted upon a rotary platform or other carrier, the slag ladle and the pouring spout remaining in a fixed position and the different generators being brought successively into position to receive slag by the rotation of the carrier. In these figures, 60 designates the generators, which are of sector form. The container of each generator is connected at its inner end with a central water supply boiler 61, by means of the double concentric tubes 62, 63. The outer tube 62 connects the water space of the container with the water space within the boiler drum 61, while the inner tube 63 extends from the container into a central steam drum 64 having a pipe 65 which extends upwardly into a drum or boiler 66. The purpose of these double tubes is to prevent interference in the water and steam circulation. Each generator 60 is supported on trunnions 67 resting on the roller bearings 68 mounted on the rotary carrier 69. The carrier may be rotated by any suitable gearing, such as the pinion 70 on the power shaft 71, and engaging the teeth of an annular rack 72 on the carrier. The outer trunnion of each container has a pinion 73 which is arranged to engage with the fixed racks 74 and 75 to provide for the rotation of the container at the proper time to invert it and to then again revert it. 76 designates the feed-water heating tank placed below the carrier at one side, and 77 is the water spray pipe for spraying the generator when inverted. The control valve 78 of this spray pipe can be automatically operated, as by means of cams 79 placed on the carrier and adapted to contact at the proper time with the spring-actuated stem 80 of said valve. Each container has a vertically movable cover 81 carried by a lever 82 pivoted at 83 and engaged by a vertical actuating rod 84 having a roller 85 at its lower end which is adapted to engage a cam rail 86. In this manner the covers may be automatically raised to the position shown at the left hand side of Fig. 9 at the proper time. 87 designates the slag ladle, and 88 the slag spout. 89 designates suitable guy rods for the purpose of adjusting and holding the upper end of the water supply boiler rigidly in the proper position. 90 designates an operator's platform, where the control mechanism (not shown) for the apparatus may be located. In Fig. 8 the left hand generator which has its cover raised, is just beginning to be inverted by the action of the segmental rack 74. The next adjacent generator to the left is completely inverted and is being sprayed, while its spent slag is discharged into the feedwater tank and onto the conveyer therein. The next generator to the left has been restored to its normal position by the action of the rack 75; and the slag tubes and top plate are being dried thoroughly by the internal heats of the steam and water. The next succeeding generator is receiving its charge of hot slag from the ladle 87.

Figure 10:
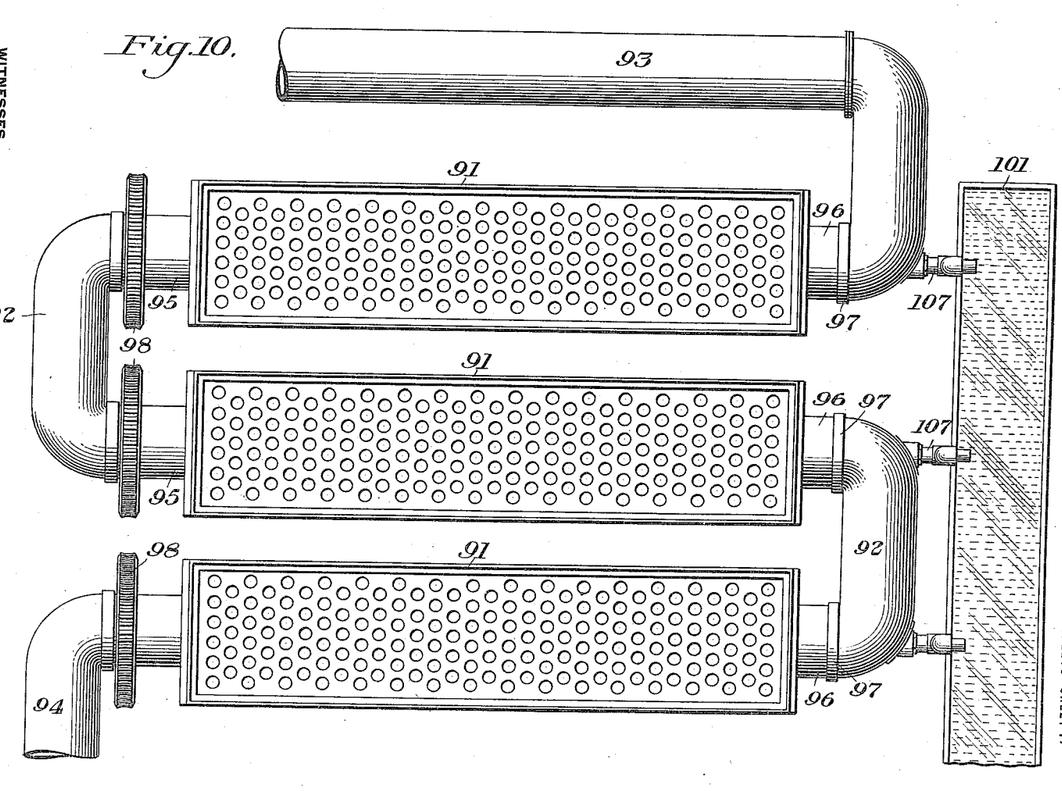
Fig. 10 is a plan view showing my invention as applied to the generation of a hot blast.
Figure 11:
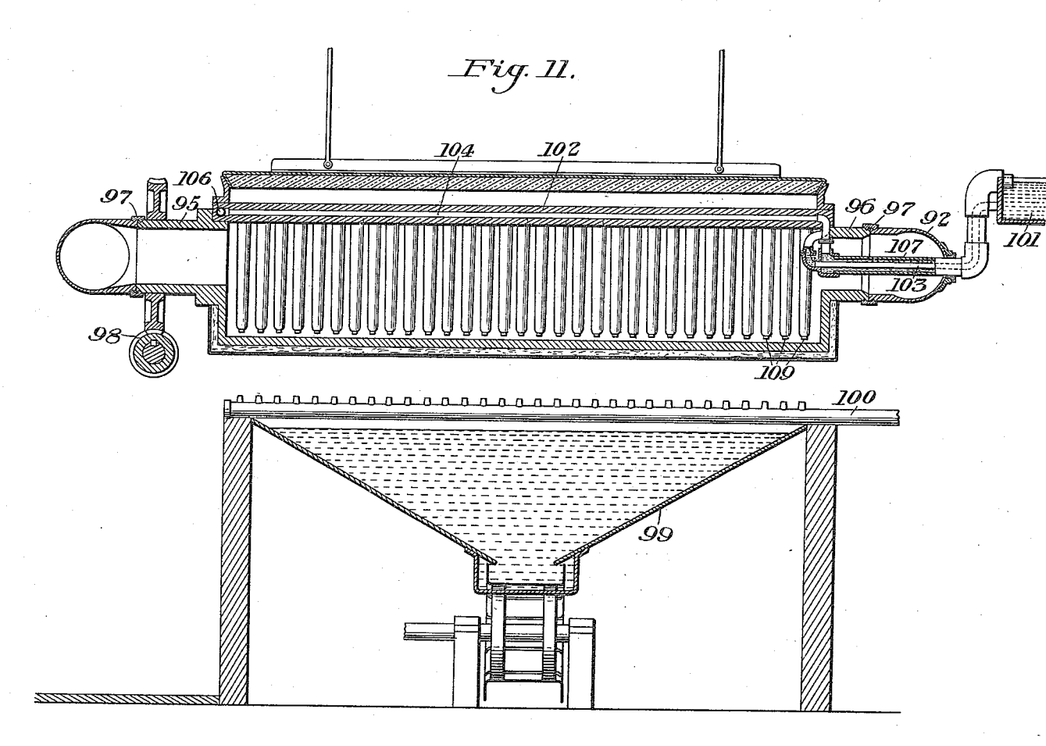
Fig. 11 is a transverse vertical section of one of the generators shown in Fig. 10.
Figure 12:
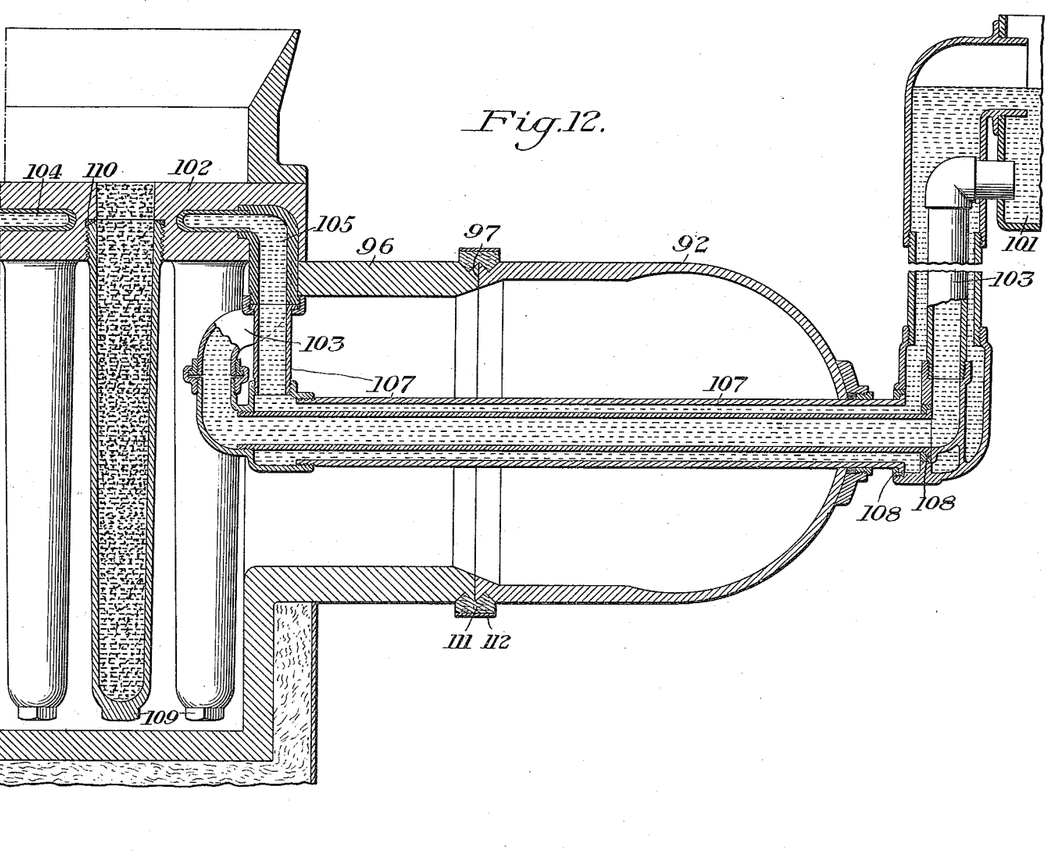
Fig. 12 is a detail sectional view showing a portion of one of the generators of Fig. 10.

In Figs. 10, 11 and 12 I have shown a form of my invention in which the molten slag is utilized for the heating of air. Fig. 10 shows three of the generators 91 coupled in series by means of the pipes 92 connecting their hollow trunnions, the first generator being connected at its opposite end to a blast pipe 93, and the last generator being connected to a pipe or main 94 which leads the air to the point of use. It will be understood that any number of the generators may be connected in series in this manner, according to the temperature desired. These generators are, in general, similar to the generators before described. They are, however, formed with a hollow trunnion 95 or 96 at each end. Each of the trunnions has a packed rotatable joint at 97 with its pipe connection. These joints are so arranged that the air cannot escape, while permitting the rotation of the generator to its inverted position. 98 designates the gearing for rotating the generators. The pipe 93 can be connected with a fan, a blower, or an air compressor, or any other source of air supply. The air in passing through each generator is compelled to travel through the plurality of slag tubes therein. It is thereby separated into many small currents and becomes thoroughly heated. 99 designates the feed-water heating tank, and 100 the sprayer.

Figure 13:
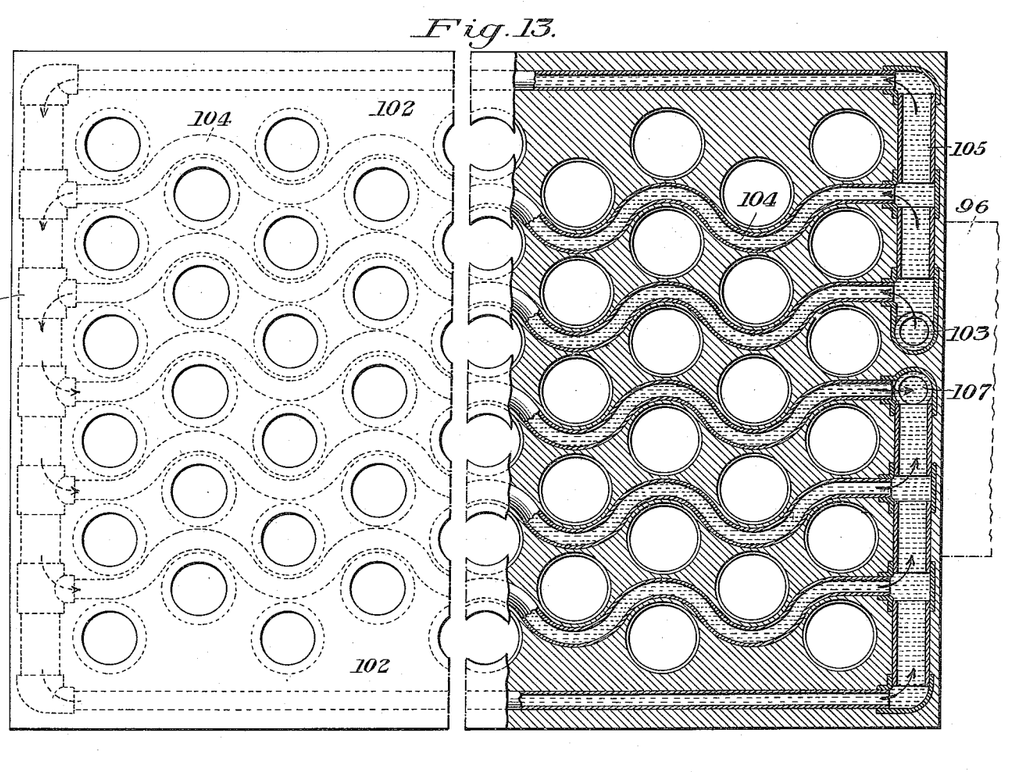
Fig. 13 is a view partly in plan and partly in horizontal section showing a preferred construction of the generator top plate.

In the steam power generators before described, the under side of the top plate of each generator is protected by being in contact with the water in the generator. This is not the case in the hot blast apparatus; and it may be found desirable to water-cool this top plate. In Figs. 11, 12 and 13 I have shown means whereby this can be effectively done by a continuous circulation of water. 101 in Figs. 11 and 12 designates a water supply, elevated to a higher level than the top plate 102 and having an inlet pipe 103 leading therefrom through the hollow trunnion 96 to the top plate, where it communicates with a series of tortuous water passages 104 between the upper ends of the slag tubes. These water passages are connected at their ends to the headers 105 and 106, the inlet pipe 103 being connected to the header 105. An outlet pipe 107 also connects with this header and leads back into the water supply tank 101, being preferably arranged concentrically around the inlet pipe 103. Each of the pipes 103, 107 is formed with a rotatable joint at 108. It will be obvious, that I may provide any suitable water-cooling means for the top plate. The operation of this form of my invention is substantially the same as before described, the heat of the slag being transferred to the air passing over the exterior surfaces of the slag tubes. Figs. 12 and 13 also illustrate the preferred method of making the slag tubes, by which they are each formed from a seamless steel pipe. Each tube has a strong wrench hold or seat 109 at its lower end, so that it can be screwed with a powerful wrench into its seat in the top plate against an inclosed gasket 110, preferably of copper. This makes an absolutely secure tight joint. Fig. 12 also illustrates a preferred method of making the packed joint 97 between the generator container trunnion and its adjacent air pipe, in which a packing ring 11 of some suitable material, such as woven asbestos and graphite, is held firmly in position by a securing band 112.

In practice I prefer to make the body and trunnions of each generator of a single casting of steel, and of approximately uniform thickness throughout. Such castings, when properly made, are strong and durable; and as the melting point is much higher than cast iron, they are not liable to burn out and fire crack. The top plates are also preferably each made of a single soft steel casting of uniform thickness throughout. After the slag tubes have been firmly screwed into their respective positions in the top plate, I prefer to grind them and buff them thoroughly on the inside with suitable mandrels made to conform to the inside shape of the tubes, so as to make each tube perfectly round on the inside, and remove any inequalities. If this is properly done, the natural shrinkage of each slag unit in cooling will insure its discharge from its tube into the feed-water tank when the generator heater is inverted, even without the help of the extra safeguard provided by the water spraying nozzles.

I prefer to make each slag tube at least one-fourth of an inch thick throughout its body, and at least one-half of an inch thick at both top and bottom, thus giving them sufficient strength to withstand the torsional strain of a wrench, and also the weight of the slag while being inverted.

When the generators are employed in heating air, the construction may be modified and cheapened, since there is no high steam pressure to safeguard, and no risk from leaks which would permit water to come in contact with the molten slag. In such cases the generator containers may be of much lighter metal, or may be of vitrified material, if desired.

The various parts, wherever necessary, can be thoroughly protected against the loss of heat units by the provision of suitable non-conducting coverings.

The advantages of my invention will be apparent to those familiar with this art. It not only embodies, in simple and practical form, the desirable features of apparatus of this character, before described, but it provides a power system of very elastic character. It is possible to provide any number of generators or heaters that the supply of molten slag will warrant. The proportion of water to the heating area can be proportioned as may be desired. Relatively high steam pressures may be generated and held until used. The transfer of heat is effected by direct contact, which may be continued indefinitely, or until the slag temperature has been reduced to the desired extent. Preferably this is about 400 degrees Fahrenheit, so that it will not detract from the required internal boiler temperature, and also so that it will retain enough heat to crack up readily under the action of the water spray. When discharged it retains sufficient heat to effect the preheating of the feed water up to about 210 degrees Fahrenheit.

I do not wish to limit myself to the particular embodiments of my invention which I have herein shown and described, as it will be obvious that various changes can be made in the details of construction and arrangement of the parts without departing from the spirit and scope of my invention as defined in the claims.

I claim:

1. A generator or heater comprising a container, a multiplicity of separate open-top slag tubes depending within the container, said tubes being all substantially parallel and normally in upright position, and means for periodically inverting the container to discharge the slag contents of said tubes, substantially as described.

2. A generator or heater comprising a container, a multiplicity of separate open-top slag tubes depending within the container, said tubes being of downwardly tapering form and being all substantially parallel and normally in upright position, whereby the slag can settle by gravity therein while cooling, and means for periodically inverting the container to discharge the slag contents of said tubes, substantially as described.

3. In apparatus of the character described, a generator or heater comprising a container, a multiplicity of separate open-top slag tubes depending within the container, means for normally holding the container in upright position, and means whereby the container may be periodically inverted to discharge the slag contents of said tubes, together with means for water-spraying said tubes when the container is inverted, substantially as described.

4. Apparatus of the character described, comprising a container which is non-cylindrical with respect to its horizontal axis and having trunnions located above its vertical center and upon which it is rotatably mounted, and also having a plurality of open-top downwardly tapered slag tubes therein, together with water and steam supply and circulating connections extending through one of the container trunnions, substantially as described.

5. In apparatus of the character described, a generator or heater comprising a container which is non-cylindrical with respect to its horizontal axis and having a substantially flat top plate, a plurality of open top slag receptacles rigidly secured in said top and depending within the container, means for normally holding the container in stationary position, and means for inverting the container when desired, substantially as described.

6. In apparatus of the character described, a generator or heater comprising a container which is non-cylindrical with respect to its horizontal axis and having a substantially flat top plate, a plurality of open-top slag receptacles rigidly secured in said top and depending within the container, means for normally holding the container in stationary position, and means for inverting the container when desired, together with a removable cover for the container above said top, substantially as described.

7. In apparatus of the character described, a generator or heater comprising a container having a top plate, a plurality of open-top slag receptacles rigidly secured in said top and depending within the container, means for normally holding the container in stationary position, and means for inverting the container when desired, together with a removable cover for the container above said top, and means for automatically raising and lowering the cover, substantially as described.

8. In apparatus of the character described, a generator or heater comprising a container, a multiplicity of separate open-top slag tubes depending within the container, means for normally holding the container in upright position, and means whereby the container may be periodically inverted to discharge the slag contents of said tubes, together with water spraying means and a control valve for said means operated by the movements of the container, substantially as described.

9. In apparatus of the character described, a generator or heater comprising a container which is non-cylindrical with respect to its horizontal axis and a top plate secured in the container, and a plurality of seamless slag tubes secured in said top plate and depending within the container to a point near the bottom thereof, substantially as described.

10. In apparatus of the character described, a generator or heater comprising a container which is non-cylindrical with respect to its horizontal axis and a top plate secured in the container, and a plurality of seamless slag tubes secured in said top plate and depending within the container to a point near the bottom thereof, said tubes occupying a major portion of the space within the container, substantially as described.

11. Apparatus of the character described, comprising a plurality of generators arranged side by side, each generator comprising a receptacle or container having a plurality of relatively small parallel, vertically arranged slag tubes therein, means for separately inverting each generator to discharge the contents of all the tubes substantially simultaneously, and a water supply boiler to which each of the generators is connected, substantially as described.

12. Apparatus of the character described, comprising a plurality of generator units, each consisting of a container which is non-cylindrical with respect to its horizontal axis and a plurality of relatively small parallel, vertically arranged slag tubes depending therein, water supply and circulating connections for each container, and means for separately inverting the containers with their slag tubes to thereby discharge the contents of all the tubes of that container substantially simultaneously, substantially as described.

13. Apparatus of the character described, comprising a plurality of generator units, each unit consisting of a container which is non-cylindrical with respect to its horizontal axis and trunnions upon which the container is rotatably mounted, a plurality of open-top slag tubes depending within each container, water and steam connections for each container leading out through one of its trunnions, and a feed-water heater below the containers and arranged to receive the slag discharged from said tubes when the containers are inverted, substantially as described.

14. Apparatus of the character described, comprising a plurality of generator units, each unit consisting of a container which is non-cylindrical with respect to its horizontal axis and trunnions upon which the container is rotatably mounted, a plurality of open-top slag tubes depending within each container, water and steam connections for each container leading out through one of its trunnions, and a feed-water heater below the containers and arranged to receive the slag discharged from said tubes when the containers are inverted, said heater having a conveyer for removing the spent slag therefrom, substantially as described.

15. In apparatus of the character described, the combination with a multiplicity of small slag tubes, of a pouring vessel for supplying said tubes, said vessel having substantially the small capacity as the combined capacity of the tubes, substantially as described.

16. In apparatus of the character described, a generator or heater comprising a normally stationary container rotatably mounted, a multiplicity of separate open-top slag tubes depending within the container, and a water and steam connection leading into one end of the container through the bearing thereof, said connection having a stuffing box therein forming a steam and water-tight rotatable connection between the parts, substantially as described.

17. In apparatus of the character described, the combination with a container having a plurality of relatively small hollow slag tubes suspended therein, of a molten slag pouring vessel having a capacity substantially equal to the total capacity of said tubes, and adjustable pouring spouts attached to and movable with the pouring vessel, substantially as described.

18. The herein described method of utilizing the heat of molten slag, which consists in delivering the slag into a plurality of relatively small tubes or receptacles projecting into the fluid or material to be heated and having downwardly converging walls, retaining said tubes or receptacles in upright quiescent position in said fluid or material until the slag has cooled to a relatively low temperature and thereby permitting the slag to settle by gravity and thus maintain a close contact with said converging walls throughout the cooling operation and then inverting said tubes to discharge the slag therefrom, substantially as described.

In testimony whereof, I have hereunto set my hand.

RALPH BAGGALEY.

Witnesses:
W. C. LYON,
H. M. CORWIN.

Copies of this patent may be obtained for five cents each, by addressing the "Commissioner of Patents, Washington, D. C."